Aug. 7, 1962   A. R. KNOWLES   3,048,687
ELECTRIC SOLDERING IRON
Filed Sept. 26, 1960   2 Sheets-Sheet 2
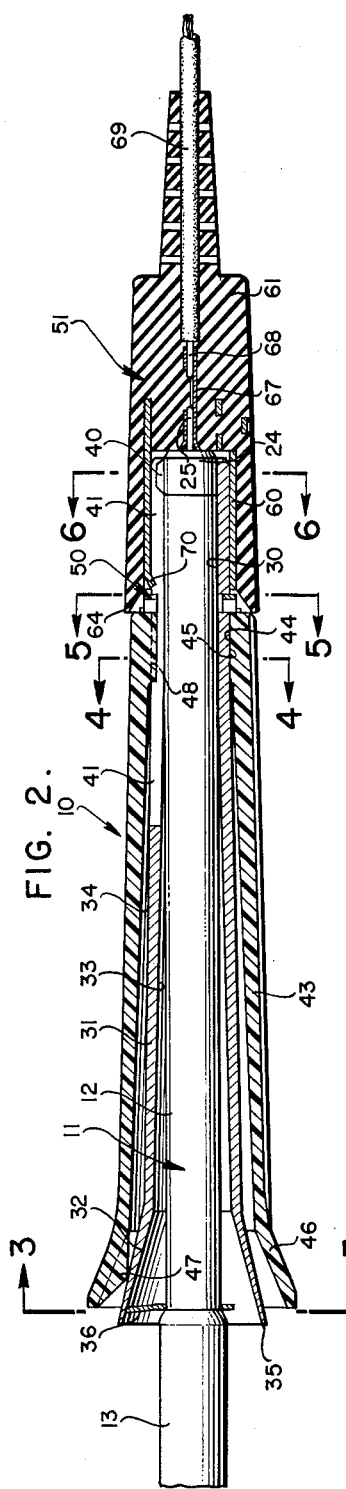
ALVIS R. KNOWLES
*INVENTOR.*
BY *Lyon+Lyon*
ATTORNEYS United States Patent Office 3,048,687
Patented Aug. 7, 1962

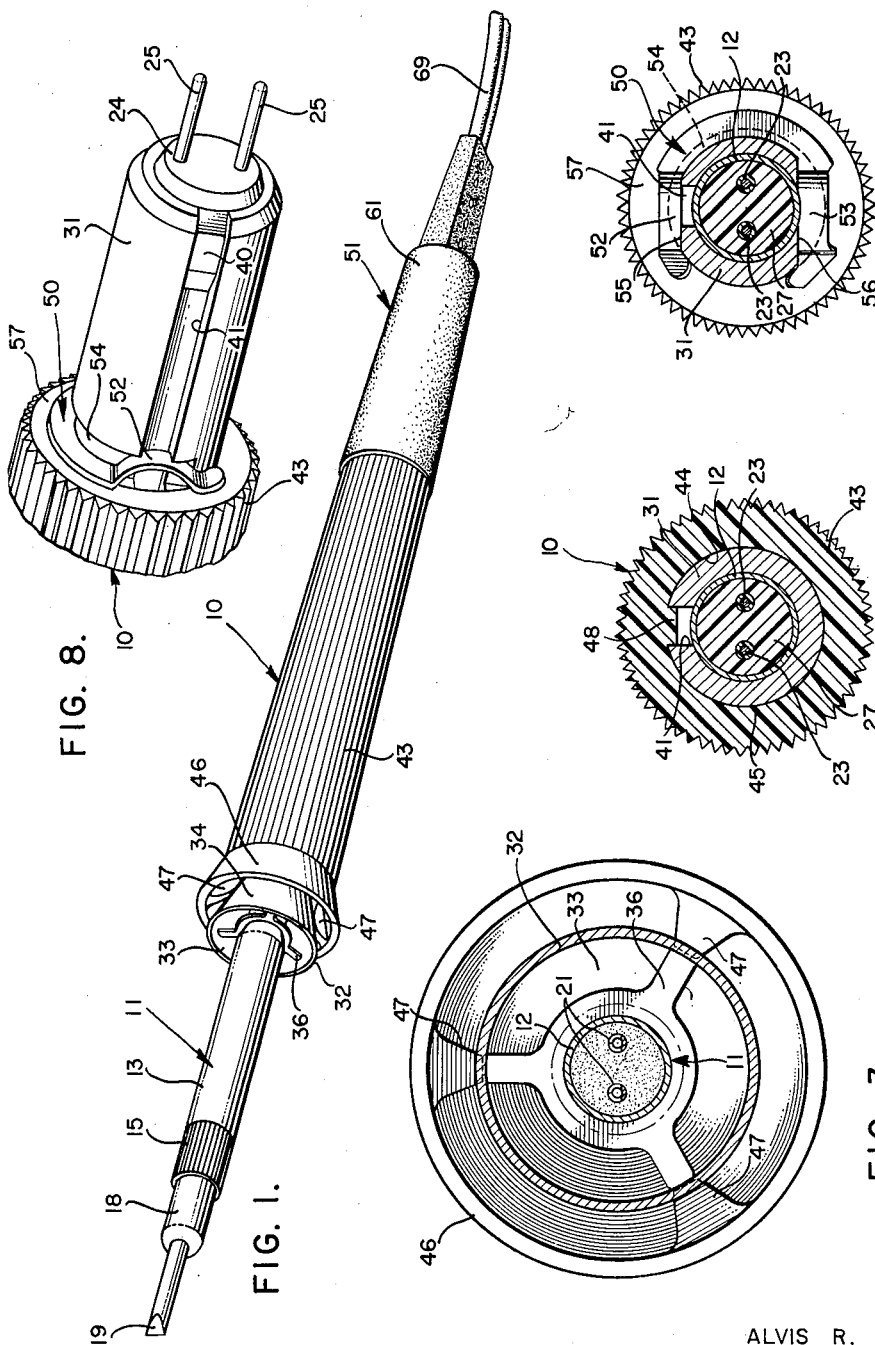

3,048,687
ELECTRIC SOLDERING IRON
Alvis R. Knowles, Manhattan Beach, Calif., assignor to Eldon Industries, Inc., Hawthorne, Calif., a corporation of California
Filed Sept. 26, 1960, Ser. No. 58,494
9 Claims. (Cl. 219—26)

This invention relates to soldering irons of the type having electrical resistance heating elements and is particularly directed to an improved form of electric soldering iron having novel means for preventing overheating of the handle.

An important object is to provide an electric soldering iron having a tapered metallic sleeve acting as a heat sink and interposed between the heating element assembly and the encircling handle.

A more detailed object is to provide a novel form of mounting for connecting the heating element assembly, the tapered metallic sleeve, and the encircling handle.

Other and more detailed objects and advantages will appear hereinafter.

In the drawings:

FIGURE 1 is a perspective view showing a preferred embodiment of my invention.

FIGURE 2 is a longitudinal sectional view of a major portion of the device shown in FIGURE 1.

FIGURES 3, 4, and 5 are transverse sectional views taken substantially on the lines 3—3, 4—4, and 5—5, respectively, as shown in FIGURE 2.

FIGURE 6 is a transverse sectional view taken substantially on the lines 6—6, as shown in FIGURE 2, with the electrical socket omitted for clarity of illustration.

FIGURE 7 is a sectional plan view partly broken away taken substantially on the lines 7—7 as shown in FIGURE 6.

FIGURE 8 is a perspective view partly broken away showing details of the connection between the heating unit assembly, the metallic sleeve, and the encircling handle, the electrical socket assembly being omitted.

FIGURE 9 is a plan view partly in longitudinal section showing the construction of the heating unit assembly.

Referring to the drawings:

The electric soldering iron generally designated 10 includes a heating unit assembly 11 which includes a central metallic tube 12. An enlargement 13 at the forward end of the tube 12 contains an electric resistance heating element 14 of conventional form. A terminal fitting 15 fixed to the forward end of the tube enlargement 13 is provided with an internal shoulder 16 which contacts the forward end of the heating element 14. An externally threaded post 17 on the terminal 15 is adapted to support an internally threaded detachable tip 18. The extreme tip end 19 of the detachable tip may be provided with a chisel point or any other suitable or desirable shape. Clips 21 connect the terminals 22 of the heating element 14 to the electrical leads 23 which extend axially through the interior of the metallic tube 12. These electrical leads 23 project from the rearward end 24 of the tube 12 to form a terminal post 25. Insulators 26 and 27 placed within the tube 12 hold the leads 23 in proper position.

The metallic tube 12 of the heating unit assembly 11 is slidably received within the cylindrical bore 30 of the tapered metallic sleeve 31. The forward end of this sleeve 31 is provided with a flaring heat reflecting section 32. Both the inner surface 33 and the outer surface 34 of the tapered metallic sleeve 31 are tapered for the major portion of the length of the sleeve. The wall thickness of the sleeve also tapers and is greatest in the region of the cylindrical bore 30 and thinnest at the forward end 35 of the flaring section 32. A metallic spacer 36 serves to center the tube 12 within the flaring section 32.

The tube 12 is provided with a radially extending key 40 which projects into a slot or keyway 41 formed axially in the sleeve 31. The proportions of the parts are such that the tube 12 may be inserted axially into position from left to right as viewed in FIGURE 2, and the engagement of the spacer 36 with the flaring section 32 limits the extent of such axial movement. A tapered tubular handle 43 is mounted concentrically of the tube 12 and sleeve 31 and is provided with a cylindrical bore 44 which engages a cylindrical surface 45 provided on the sleeve 31. The forward end of the handle 43 is provided with a flared enlargement 46 and a plurality of centering lugs 47 are provided on this enlargement 46 for engagement with the flaring section 32 of the metallic sleeve 31. An inwardly directed lip or key 48 provided on the body 43 extends into the axial slot 41 on the metallic sleeve 31. The non-metallic handle or body 43 is assembled on the metallic sleeve 31 by relative telescopic motion, the handle moving from right to left as viewed in FIGURE 2. At the time of this assembly operation, the retainer 50 is absent. After the metallic sleeve 31 and handle 43 are assembled, the retainer 50 is installed in position to prevent their disassembly. This occurs prior to installation of the socket member generally designated 51. The tube 12 may be installed and removed without disconnecting the parts 31, 43, 50 or 51.

The retainer 50 is clearly shown in FIGURES 5, 7, and 8, and comprises a generally U-shaped leaf spring having offset bowed sections 52 and 53. The arcuate portion of the retainer 50 extends into a groove 54 provided on the outer surface of the metallic sleeve 31 and the offset bowed portion 52 rests in a flatbottomed groove 55 which forms a continuation of the arcuate groove 54. The offset bowed portion 53 rests in a flatbottomed groove 56 which also forms an extension of the arcuate groove 54. The bowed section 52 engages the axial slot 41 at the location where it intersects the flatbottomed groove 55. The bowed portion 53 engages the outer surface of the tube 12 in friction contact through the window opening 56a and thus restrains relative movement of the tube 12 with respect to the metallic sleeve 31. The retainer 50 engages the end surface 57 of the body 43, and hence relative movement of the parts 12, 31, and 53 is prevented by means of the retainer 50.

The electrical socket, generally designated 51, includes an internal shell 60 formed of metal and embedded within a housing 61 formed of plastic material. A spring finger 62 on the shell 60 projects into a shallow recess 63 provided in the outer surface of the metallic sleeve 31 and this serves to hold the socket member 51 in place on the projecting end of the sleeve 31. The forward end 64 of the non-metallic housing 61 encircles and encloses the retainer 50. The cylindrical outer surface 65 of the projecting end of the sleeve 31 is received and supported within the bore 66 of the shell 60. Metallic receptacles 67 are mounted to receive the terminal posts 25 which project from the heating element assembly 11 and these receptacles are connected by suitable electrical leads 68 to the multiple wire power supply cord 69. A projection 70 on the forward end of the shell 60 (see FIGURE 2) extends into the axial slot 41 provided on the metallic sleeve 31. Accordingly, assembly and disassembly of the electrical socket 51 with respect to the metallic sleeve 31 and electrical terminals 25 is accomplished by a relative telescopic movement of the parts, the projection 70 being received in the slot 41 and the terminal posts 25 being received within the receptacles 67. If the multiple wire power supply cord 69 contains a third wire which is a ground wire, it may be connected internally of the socket 51 with the metallic shell 60, thereby grounding the sleeve 31 and the heating unit assembly 11.

In operation, electrical energy supplied through the electrical socket 51 to the terminal posts 25 causes the resistance element 14 to generate heat and the heat is conveyed by conduction to the threaded connection 17 and detachable tip 18. The heating element 14 is located forwardly of the position of the flaring section 32 of the metallic tapered sleeve 31 and hence heat radiated by the tube enlargement 13 is reflected by the inner tapered bore 47 of the flaring section 32. The metallic sleeve 31 functions as a heat sink and the heat is radiated from the forward flared end of the metallic sleeve, thereby serving to maintain the handle or body 43 at a temperature cool enough for manual manipulation of the handle. The steeply tapered portion 46 at the forward end of the handle provides a convenient rest for the fingers and thumb of the operator.

Having fully described my invention it is to be understood that I am not to be limited to the details herein set forth, but that my invention is of the full scope of the appended claims.

I claim:

1. In an electric soldering iron assembly, the combination of: a central tube having an electrical resistance heating element mounted in a forward end thereof, electrical leads within said tube connected to said heating element, a metal sleeve encircling said tube and being tapered throughout the major portion of its length, said sleeve being provided with a forward flaring heat reflecting section at one end, the other end of said sleeve providing a support for axial sliding reception of said tube, a non-metallic body encircling said tapered metal sleeve and having a bore slidably receiving a portion of said other end of said metal sleeve, and retainer means removably mounted upon the sleeve and engaging said body to prevent axial separation of said sleeve and body.

2. In an electric soldering iron assembly, the combination of: a central tube having an enlarged forward end, a hollow terminal fixed at the forward end of said tube enlargement, an electrical resistance heating element mounted within said hollow terminal, electrical leads within said tube connected to said heating element, a metal sleeve encircling said tube and being tapered throughout the major portion of its length, said metal sleeve being provided with a forward flaring heat reflecting section at one end, the other end of said tapered metal sleeve providing a support for axial sliding reception of said tube, a tapered non-metallic body encircling said tapered metal sleeve and having a flared end centered by said flaring section of said tapered metal sleeve, said body having a bore at the other end thereof slidably receiving a portion of said other end of said metal sleeve, and retainer means removably mounted upon the sleeve and engaging said body and said tube to prevent axial separation of said sleeve and body and to restrain axial separation of said tube.

3. In an electric soldering iron assembly, the combination of: a central tube having a forward end, an electrical resistance heating element mounted in said forward end of said tube, electrical leads within said tube connected to said heating element, a metal sleeve encircling said tube and being tapered throughout the major portion of its length, said metal sleeve being provided with a forward flaring heat reflecting section at one end, the other end of said sleeve providing a support for axial sliding reception of said tube, a non-metallic body encircling said sleeve and having a flared end centered by said flaring section of said sleeve, said body having a bore at the other end thereof slidably receiving a portion of said other end of said metal sleeve, and retainer means removably mounted upon the sleeve and engaging said body to prevent axial separation of said sleeve and said body, said retainer means also contacting a portion of said central tube to restrain the tube and sleeve against axial separation.

4. In an electric soldering iron assembly, the combination of: a central tube having an enlarged forward end joined thereto by an external shoulder, an electrical resistance heating element mounted in said enlarged forward end of said tube, electrical leads within said tube connected to said heating element, a tapered metal sleeve encircling said tube and provided with a forward flaring heat reflecting section at one end and encircling said shoulder, a spacer element encircling said tube and contacting said shoulder and said flaring section and acting to hold the tube concentric within said sleeve, the other end of said sleeve providing a support for sliding reception of said tube, a tapered non-metallic body encircling said sleeve and having a flared end centered by said flaring section of said sleeve, said body having a bore at the other end thereof slidably receiving a portion of said sleeve, and retainer means removably mounted upon the sleeve and engaging said body to prevent axial separation of said sleeve and said body, said retainer means also contacting a portion of said central tube to hold the tube and sleeve against axial separation.

5. In an electric soldering iron assembly, the combination of: a central tube having an enlarged forward end joined theerto by an external shoulder, an electrical resistance heating element mounted in said enlarged forward end of said tube, electrical leads within said tube connected to said heating element, a tapered metal sleeve encircling said tube and provided with a forward flaring heat reflecting section at one end and encircling said shoulder, a spacer element encircling said tube and contacting said shoulder and said flaring section and acting to hold the tube concentric within said sleeve, the other end of said sleeve providing a support for sliding reception of said tube, a tapered non-metallic body encircling said sleeve and having a flared end centered by said flaring section of said tapered metal sleeve, said body having a bore at the other end thereof slidably receiving a portion of said sleeve, a portion of the sleeve projecting exteriorly of said bore and provided with a circumferentially extending groove and a window opening, and retainer means comprising a U-shaped leaf spring mounted in said groove and engaging said body and contacting said tube through said window opening to prevent axial separation of said tube, sleeve and body.

6. In an electric soldering iron assembly, the combintaion of: a central tube having an electrical heating element mounted at a forward end therreof, said tube having a cylindrical portion remote from said forward end, a tapered metal sleeve encircling said tube and having a flaring section at its forward end, the tube projecting beyond the flaring section of the metal sleeve, said metal sleeve having a rearward cylindrical bore slidably receiving said cylindrical portion of said tube, the major portion of the length of the sleeve being spaced from said tube, a non-metallic tapered body encircling both the tube and the sleeve and having a rearward portion thereof receiving the rearward portion of the sleeve in supporting engagement, the metal sleeve and the non-metallic body tapering in the same direction, the body having a major portion of the length spaced from said sleeve, whereby the sleeve serves as a heat sink to limit radiation of heat from said tube to said body.

7. In an electric soldering iron assembly, the combination of: a central tube having an electrical heating element mounted at a forward end thereof, a tapered metal sleeve encircling said tube and having a flaring section at its forward end, the tube projecting beyond the flaring section of the metal sleeve, a non-metallic tapered body encircling both the tube and the sleeve, the metal sleeve and the non-metallic body tapering in the same direction, the small end of the tapered metal sleeve having means for supporting the central tube and means whereby it is supported within the small end of said tapered body.

8. In an electric soldering iron assembly, the combination of: a central tube having an enlarged forward end, an electrical heating element mounted in said forward end, a tapered metal sleeve encircling said tube and having a flaring section at its forward end, said sleeve having a rearward portion thereof contacting and supporting a rearward portion of said tube, the major portion of the length of the sleeve being spaced from said tube, the tube projecting beyond the flaring section of the metal sleeve, a non-metallic body encircling both the tube and the sleeve and having a rearward portion thereof receiving a portion of the sleeve in supporting engagement, the body having a major portion of the length thereof spaced from said sleeve, whereby the sleeve serves as a heat sink to limit radiation of heat from said tube to said body.

9. In an electric soldering iron assembly, the combination of: a central tube having an electrical heating element mounted in a forward end thereof, a tapered metal sleeve encircling said tube and having a rearward portion thereof contacting and supporting a rearward portion of said tube, the major portion of the length of the sleeve being spaced from said tube, the tube projecting beyond the flaring section of the metal sleeve, a non-metallic body encircling both the tube and the sleeve and having a rearward portion thereof receiving a portion of the sleeve in supporting engagement, and means including a detachable element removably connecting both the tube and body to said sleeve.

References Cited in the file of this patent

UNITED STATES PATENTS

| | | |
|---|---|---|
| 1,128,102 | Campbell | Feb. 9, 1915 |
| 1,927,570 | Lofthouse | Sept. 19, 1933 |
| 2,283,343 | Weiskopf | May 19, 1942 |
| 2,569,250 | Mims | Sept. 25, 1951 |

FOREIGN PATENTS

| | | |
|---|---|---|
| 560,806 | Great Britain | Apr. 20, 1944 |
| 589,892 | Great Britain | July 2, 1947 |
| 633,020 | Great Britain | Dec. 5, 1949 |
| 636,714 | Great Britain | May 3, 1950 |